(12) United States Patent
Bohn

(10) Patent No.: US 10,409,074 B2
(45) Date of Patent: Sep. 10, 2019

(54) NEAR-TO-EYE DISPLAY WITH STEERABLE PHASED ARRAYS

(71) Applicant: MICROSOFT TECHNOLOGY LICENSING, LLC, Redmond, WA (US)

(72) Inventor: David Douglas Bohn, Fort Collins, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/585,506

(22) Filed: May 3, 2017

(65) Prior Publication Data

US 2018/0321496 A1 Nov. 8, 2018

(51) Int. Cl.
*G02F 1/01* (2006.01)
*G02B 26/00* (2006.01)
(Continued)

(52) U.S. Cl.
CPC ..... *G02B 27/0176* (2013.01); *G02B 27/0093* (2013.01); *G02B 27/0172* (2013.01);
(Continued)

(58) Field of Classification Search
CPC ........ G02F 1/29; G02F 1/0105; G02F 1/1334; G02F 1/17; G02F 1/3558;
(Continued)

(56) References Cited

U.S. PATENT DOCUMENTS

| 5,544,268 A | * | 8/1996 | Bischel | .................. G02F 1/011 385/16 |
| 7,729,572 B1 | | 6/2010 | Pepper et al. | |

(Continued)

FOREIGN PATENT DOCUMENTS

CN 10207318 A 5/2011

OTHER PUBLICATIONS

Heck, Martijn J.R., "Highly integrated optical phased arrays: photonic integrated circuits for optical beam shaping and beam steering", In Journal of Nanophotonics, Jun. 25, 2016, pp. 1-16.
(Continued)

*Primary Examiner* — Brandi N Thomas
(74) *Attorney, Agent, or Firm* — Newport IP, LLC; Scott Y. Shigeta

(57) ABSTRACT

Near-to-eye devices with steerable phased arrays are provided. In some configurations, a device comprises waveguides, e.g., color plates, that are individually formed to couple a corresponding color output of a micro-display engine and project an image into a human vision system. Some configurations include steerable phased arrays for generating light defining a field of view of image content. The generated light is aligned with light from a real-world view to create an output that concurrently displays the real-world view with the field of view of the image content. The light from the steerable phased arrays is directed through one or more waveguides to an output region of the one or more waveguides. The light from the real-world view can pass through transparent portions of waveguides in a manner that aligns a rendering of the image content with the light from the real-world view to create augmented reality views.

6 Claims, 14 Drawing Sheets

(51) Int. Cl.
*G02B 27/01* (2006.01)
*G02B 27/00* (2006.01)
*G06F 3/01* (2006.01)
*G09G 5/00* (2006.01)
*G09G 3/00* (2006.01)
*G09G 3/02* (2006.01)
*G02B 27/14* (2006.01)

(52) U.S. Cl.
CPC .............. *G06F 3/015* (2013.01); *G09G 3/003* (2013.01); *G09G 5/005* (2013.01); *G02B 27/14* (2013.01); *G02B 2027/014* (2013.01); *G02B 2027/0178* (2013.01); *G09G 3/02* (2013.01); *G09G 2340/12* (2013.01)

(58) Field of Classification Search
CPC .... G02F 2001/294; G02F 1/011; G02F 1/377; G02F 2201/30; G02F 2201/305; G02F 2201/307; G02F 1/035; G02F 1/093; G02F 1/133615; G02F 1/225; G02F 1/2955; G02F 1/3132; G02F 1/3137; G02B 6/003; G02B 6/0038; G02B 6/0068; G02B 6/0073; G02B 6/0083; G02B 6/2746; G02B 6/3538; G02B 2006/12119; G02B 2006/1215; G02B 2027/015; G02B 26/0841; G02B 27/0101; G02B 5/18; G02B 6/0001; G02B 6/0006; G02B 6/0033; G02B 6/02347

USPC ................ 359/237, 265–267, 270–273, 279, 359/290–292, 298
See application file for complete search history.

(56) References Cited

U.S. PATENT DOCUMENTS

| | | |
|---|---|---|
| 2002/0154377 A1 | 10/2002 | Pepper |
| 2007/0122155 A1 | 5/2007 | Hillis et al. |
| 2008/0239420 A1 | 10/2008 | Mcgrew |
| 2013/0235441 A1 | 9/2013 | Davis et al. |
| 2014/0192394 A1 | 7/2014 | Sun et al. |
| 2015/0235457 A1 | 8/2015 | Schowengerdt |
| 2016/0274437 A1 | 9/2016 | Russo et al. |

OTHER PUBLICATIONS

Campbell, et al., "Optical Phased Arrays", http://www.orionsarm.com/eg-article/49d2d77d2227b, Published on: Nov. 15, 2007, 3 pages.

Hecht, Jeff, "Phased Arrays: Nanophotonic array is CMOS-compatible", http://www.laserfocusworld.com/articles/print/volume-49/issue-03/world-news/phased-arrays-nanophotonic-array-is-cmos-compatible.html, Published on: Nov. 3, 2013, NA pages.

Yaacobi, Ami, "Integrated optical phased arrays for lidar application", In Thesis Ph. D, Massachusetts Institute of Technology, Jun. 2015, 120 pages.

* cited by examiner

NEAR-TO-EYE DISPLAY WITH STEERABLE PHASED ARRAYS

BACKGROUND

Some devices include waveguides for providing near-to-eye display capabilities. For example, a head mounted display ("HMD") can include waveguides to provide a single-eye display or a dual-eye display to a user. Some devices are designed to provide a computer-generated image ("CGI") to a user, while other devices are designed to provide a mixed environment display, which includes superimposing a CGI over a real-world view. Thus, a user can see a real-world view of objects in their surrounding environment along with a CGI, a feature that is sometimes referred to as an "augmented reality display" because a user's view of the world can be augmented with a CGI. Although such devices are becoming more commonplace, developments to improve the sharpness of displayed images will continue to be a priority. In addition, there is a need for designs that improve the battery life, as well as a need to reduce the cost and weight of such devices.

The disclosure made herein is presented with respect to these and other considerations. It is with respect to these and other considerations that the disclosure made herein is presented.

SUMMARY

Technologies described herein provide a near-to-eye display with steerable phased arrays. In some configurations, a device comprises a number of waveguides, e.g., color plates, that are individually formed to couple a corresponding color output of a display device and project an image into a human vision system. Some configurations include steerable phased arrays for generating, light defining a field of view of image content. The generated light is aligned with light from a real-world view to create an output that concurrently displays the real-world view with the field of view of the image content. The light from the steerable phased arrays is directed through one or more waveguides to an output region of the one or more waveguides. The light from the real-world view can pass through transparent portions of waveguides in a manner that aligns a rendering of the image content with the light from the real-world view. The techniques disclosed herein can provide both (1) an augmented reality display, e.g., a mixed environment display including a real-world view of natural light reflecting from a real-world object and a computer-generated rendering, and (2) a virtual reality display, which can include a fully computer generated rendering.

It should be appreciated that the above-described subject matter may also be implemented as part of a computer-controlled apparatus, a computing system, part of an article of manufacture, or a process for making the same. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
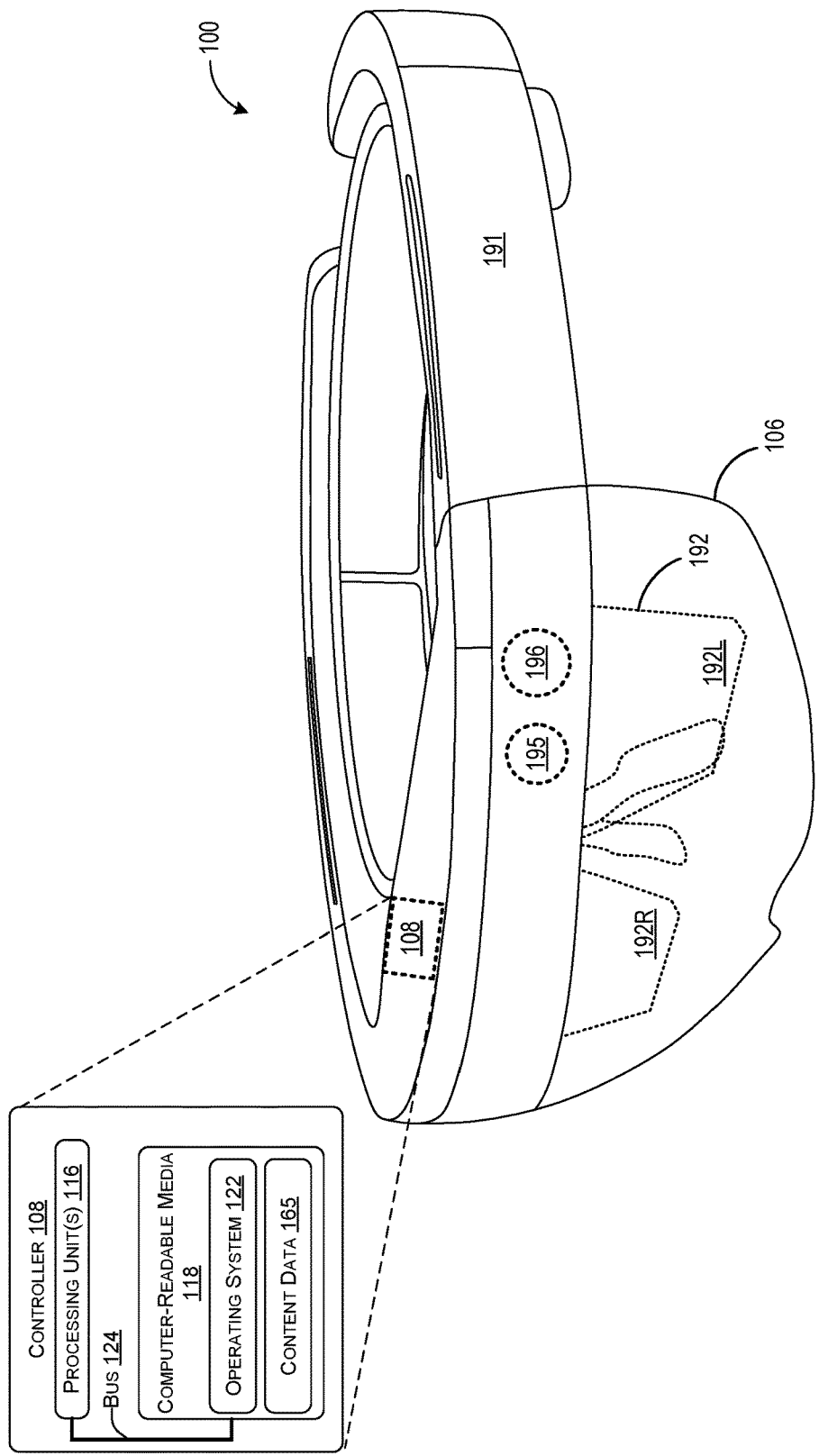
FIG. 1 shows an example computing system that may utilize aspects of the present disclosure.

FIG. 1 shows an example optical system in the form of a head-mounted display (HMD) 100 that may utilize scanning of light from a linear light source for image generation. The head-mounted display 100, which is also referred to herein as a "computing system 100." includes a frame 191 in the form of a band wearable around a head of a user that supports see-through display componentry positioned near the user's eyes. The head-mounted display 100 may utilize augmented reality technologies to enable simultaneous viewing of virtual display imagery and a view of a real-world background. As such, the head-mounted display 100 is configured to generate virtual images via see-through display 192. The see-through display 100, as depicted, includes separate right and left eye displays 192R and 192L, which may be wholly or partially transparent. In other examples, a see-through display may have a single display viewable with both eyes. The see-through display 192 can be in any suitable form, such as a waveguide, a number of waveguides, or one or more prisms configured to receive a generated image and direct the image towards a wearer's eye. The see-through displays 192 may include any suitable light source for generating images, such as the waveguides and other components disclosed herein.

The head-mounted display 100 further includes an additional see-through optical component 106, shown in FIG. 1 in the form of a see-through veil positioned between see-through display 192 and the background environment as viewed by a wearer. A controller 110 is operatively coupled to the see-through optical component 192 and to other display componentry. The controller 110 includes one or more logic devices and one or more computer memory devices storing instructions executable by the logic device(s) to enact functionalities of the display device. The controller 110 can comprise one or more processing unit(s) 116, computer-readable media 118 for storing an operating system 122 and data, such as content data 165. As will be described in more detail below, the computing system 100 can also include a linear light source and one or more scanning devices. The components of computing system 100 are operatively connected, for example, via a bus 124, which can include one or more of a system bus, a data bus, an address bus, a PCI bus, a Mini-PCI bus, and any variety of local, peripheral, and/or independent buses.

The processing unit(s), processing unit(s) 116, can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

As used herein, computer-readable media, such as computer-readable media 118, can store instructions executable by the processing unit(s). Computer-readable media can also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media can include computer storage media and/or communication media. Computer storage media can include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, rotating media, optical cards or other optical storage media, magnetic storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media can embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

The head-mounted display 100 may further include various other components, for example a two-dimensional image camera 195 (e.g. a visible light camera and/or infrared camera) and a depth camera 196, as well as other components that are not shown, including but not limited to eye-gaze detection systems (e.g. one or more light sources and eye-facing cameras), speakers, microphones, accelerometers, gyroscopes, magnetometers, temperature sensors, touch sensors, biometric sensors, other image sensors, energy-storage components (e.g. battery), a communication facility, a GPS receiver, etc.

Figure 2A:
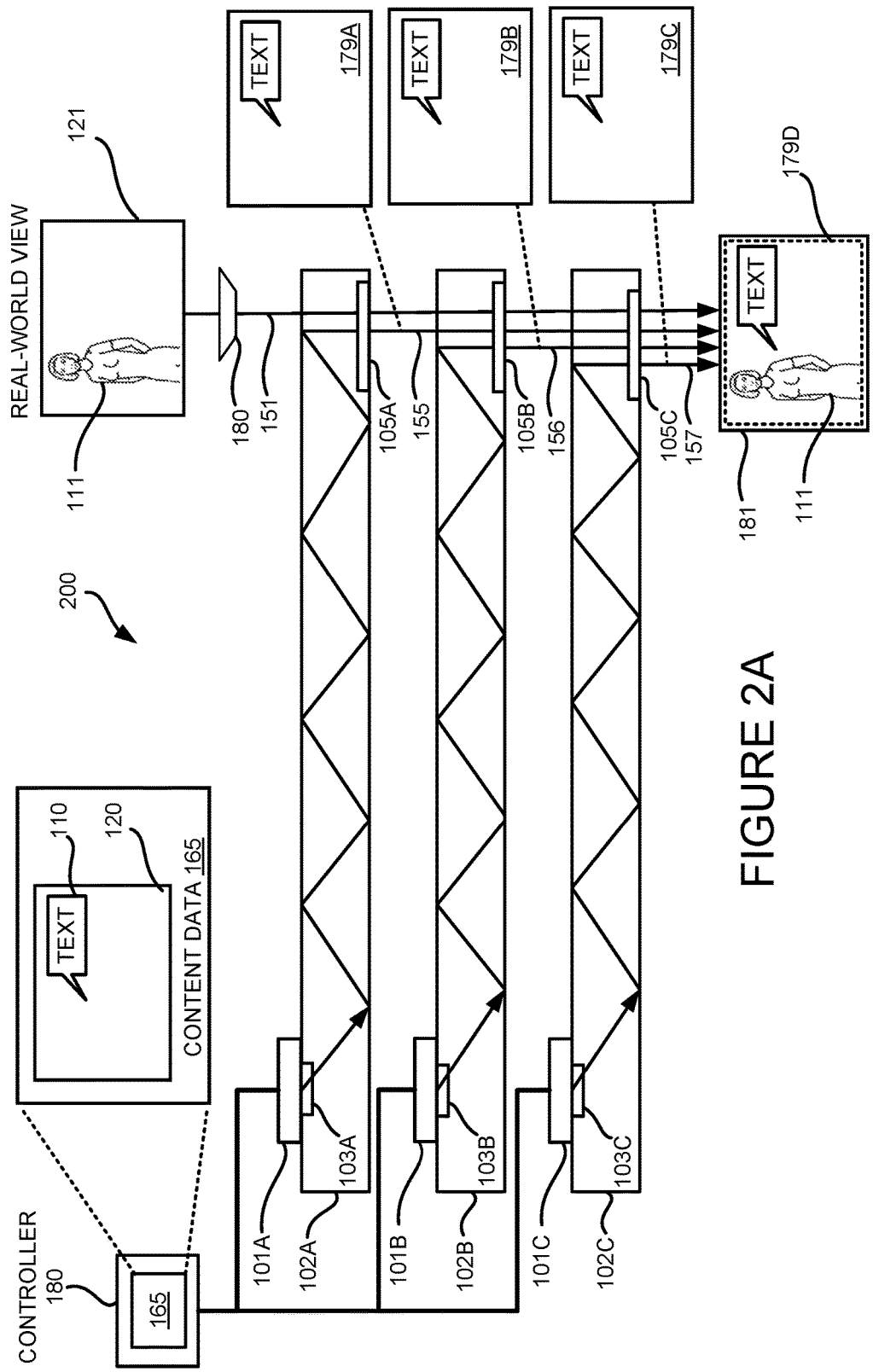
FIG. 2A illustrates aspects of an optical device including a number of waveguides and a number of steerable phased arrays.

FIG. 2A schematically shows an example optical device 200 suitable for use in the head-mounted display 100. In some configurations, the optical device 200 includes a first waveguide 102A, a second waveguide 102B, and a third waveguide 102C, which are individually and collectively referred to herein as a "waveguide 102" or a "grating structure 102." The optical device 200 can also include a first steerable phased array 101A, a second steerable phased array 101B, and a third steerable phased array 101C, which are individually and collectively referred to herein as a "steerable phased array 101."

In some configurations, the optical device 200 includes a controller 110 for modulating one or more output signals comprising image data 165 that defines image content 120. The first steerable phased array 101A can generate a first light 155 of a first predetermined wavelength range. The first light 155 can form a first field of view 179A of the image content based 120 on the one or more output signals. The first waveguide 102A can include a first input region 103A for receiving the first light 155 and a first output region 105A. The first waveguide 102A can be configured to reflect the first light 155 within the first waveguide 102A towards the first output region 105A.

The second steerable phased array 101B can generate a second light 156 of a second predetermined wavelength range. The second light 156 can form a second field of view 179B of the image content 120 based on the one or more output signals of the controller 110. The second waveguide 102B can include a second input region 103B for receiving the second light 156 and a second output region 105B. The second waveguide 102B can reflect the second light 156 within the second waveguide 102B towards the second output region 105B.

The third steerable phased array 101C can generate a third light 157 of a third predetermined wavelength range. The third light 157 can form a third field of view 179C of the image content 120 based on the one or more output signals of the controller 110. The third waveguide 102C can have a third input region 103C for receiving the third light 157 and a third output region 105C. The waveguide 102C can reflect the third light 157 within the third waveguide 102C towards the third second output region 105C. In some configurations, the first output region 105A, the second output region 105B, and the third output region 105C are aligned with a lens 180 directing light 151 from a real-world view 121 to create an output 181 that concurrently displays a real-world view 121 with a composite field of view 179D of the first field of view 179A, the second field of view 179B, and the third field of view 179C.

Each of the predetermined wavelength ranges described herein can include a green light, a red light, or a blue light. For instance, the first predetermined wavelength range, second predetermined wavelength range, and the third predetermined wavelength range can individually include a first range including 460 nm (blue), a second range including 525 nm (green), or a third range including 617 nm (red). It can be appreciated that the ranges can be in any order. For example, the order of the steerable phased arrays, e.g., the first array 101A, the second array 101B, and the third array 101C, can be: RGB, GBR, BRG, RBG, GRB, BGR, etc. Other wavelength ranges can be included herein, some of which can include other colors or parts of the light spectrum.

Figure 2B:
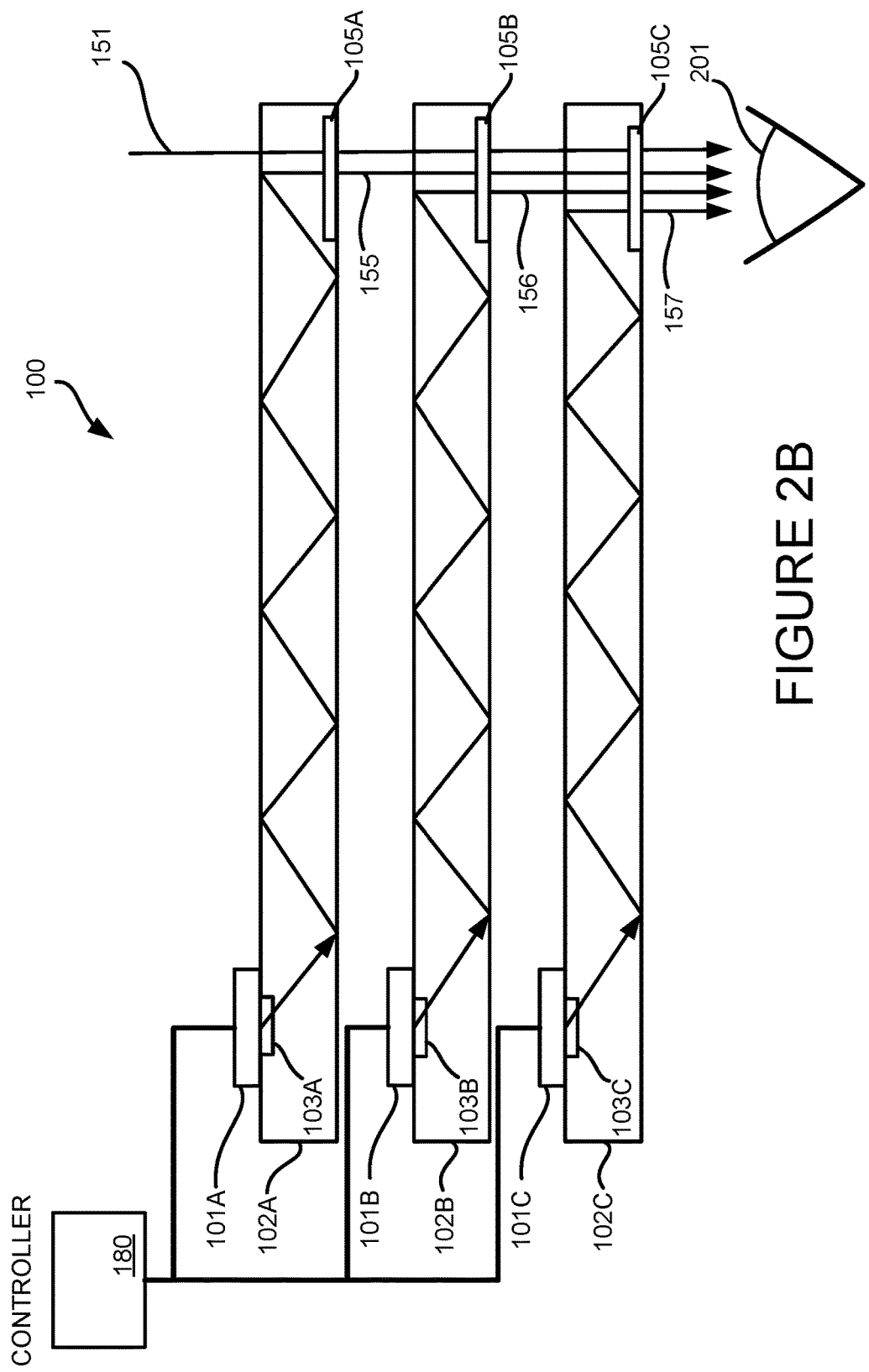
FIG. 2B illustrates aspects of an optical device in relation to a user's eye.

The optical device 200, and the other optical devices disclosed herein, are configured to enable a user to simultaneously view objects from different environments. In some configurations, the optical device 200 can display image content 120, e.g., a CGI comprising a rendering of an object 110. In addition, some configurations of the optical device 200 can allow a user to see through sections of the optical device 200, enabling the user to view real-world objects in his or her surrounding environment. In the example of FIG. 2A, light 151 from a real-world view 121 includes a view of a real-world object 111. For illustrative purposes, a user's perspective looking at real-world objects 111 through the optical device 200 is referred to herein as a "real-world view of a real-world object" or a "real-world view of a physical object." A real-world object 111 for instance may be a person standing in front of the user of the device 200. The optical device 200 aligns the output light of the output regions 105 to enable an output view 130, where the CGI 120 is superimposed over the real-world view 121. For illustrative purposes, the output view 130 is referred to as a "mixed environment" display. To create such features, the first output region 105A, the second output region 105B, the third output region 105C, and the lens 180 can be aligned to position, e.g., project, a rendered object 110 in a predetermined position relative to a view of a real-world object 111. In addition, the light 151 from the real-world view can pass through transparent sections of the first waveguide 102A, the second waveguide 102B, and the third waveguide 102C. The light 151 from the real-world view can be directed by any optical device 180, which may be a lens, a wedge, a mirror, etc. FIG. 2B and other figures described herein illustrate that the output 181 can be directed to a user's eye 201.

For illustrative purposes, a number of components and other items illustrated in FIG. 2A are part of the configurations illustrated in the other figures. For instance, the embodiments shown in FIG. 3 through FIG. 5B and FIGS. 7A-7D also involve a lens 180 directing light 151 from a real-world view 121 to create an output 181 as shown in FIG. 2A. Such embodiments can also involve the use of image data 165, which is also referred to herein as content data 165, for causing the display of content in the output 181. In addition, such embodiments can also involve field of views, which can involve any combination of light at one or more predetermined wavelength ranges. For instance, in figures referring to the first light 155, the second light 156, and the third light 157 each respectively include the first field of view 179A, the second field of view 179B, and the third field of view 179C shown in FIG. 2A. In addition, each drawing that includes an output of light, such as the first light 155, the second light 156, and the third light 157, also generates a composite field of view 179D, which maybe from a combination of views, such as the first field of view 179A, the second field of view 179B, and the third field of view 179C.

Figure 3:
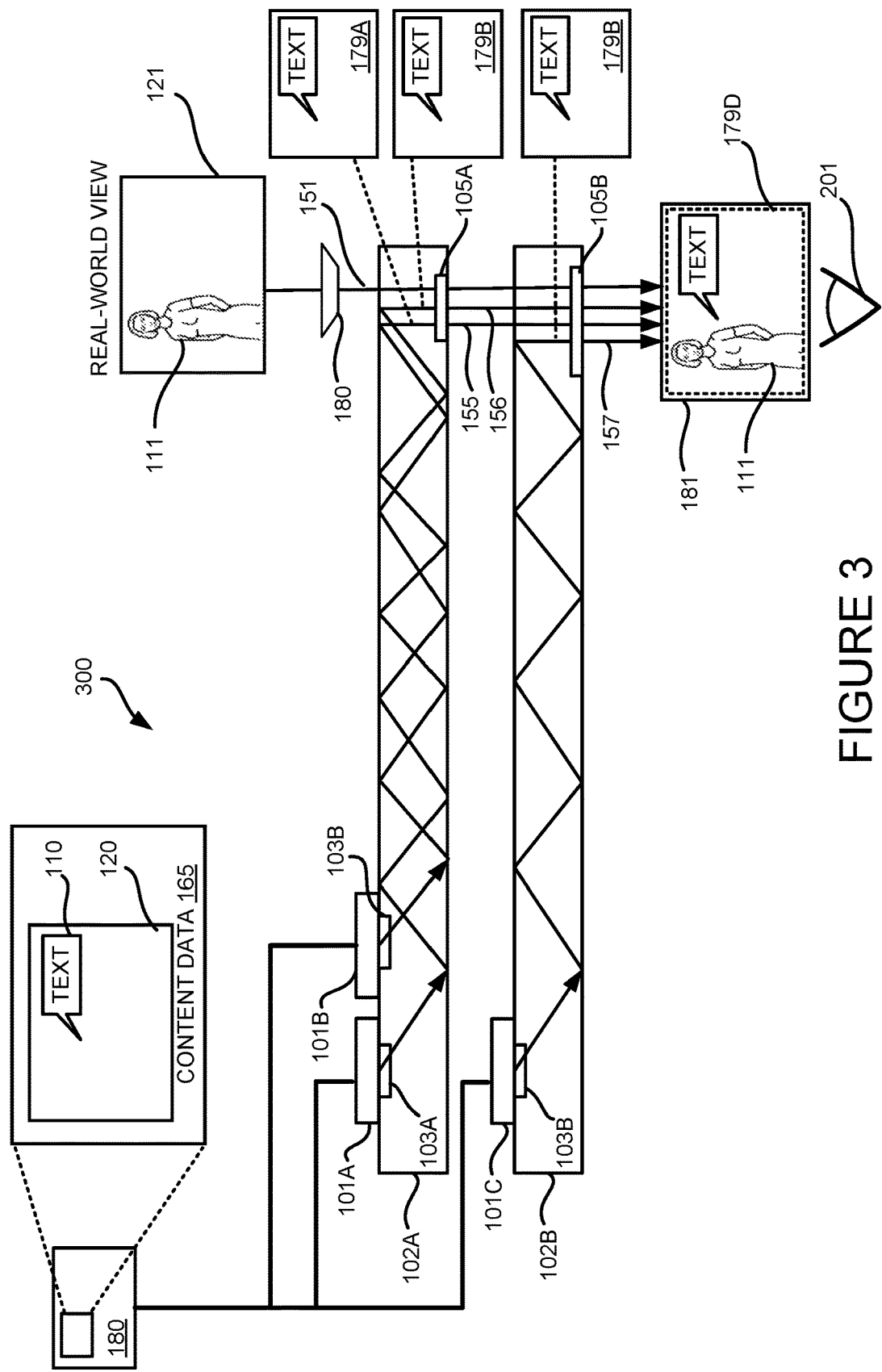
FIG. 3 illustrates aspects of an optical device including two waveguides and three steerable phased arrays.

FIG. 3 illustrates aspects of an optical device 300 including two waveguides and three steerable phased arrays. Similar to the optical device 200 of FIG. 2A, the optical device 300 of FIG. 3 is configured to enable a user to simultaneously view objects from different environments.

In some configurations, the optical device 300 comprises a controller 110 modulating one or more output signals. The one or more output signals can include content data 165 defining image content 120. The optical device 300 includes a first waveguide 102A and a second waveguide 102B, which are individually and collectively referred to herein as a "waveguide 102" or a "grating structure 102." The optical device 200 can also include a first steerable phased array 101A, a second steerable phased array 101B, and a third steerable phased array 101C, which are individually and collectively referred to herein as a "steerable phased array 101."

The first steerable phased array 101A can generate a first light 155 of a first predetermined wavelength range, the first light 155 forming a first field of view of the image content based 120 on the one or more output signals. The second steerable phased array 101B can generate a second light 156 of a second predetermined wavelength range, and the second light 156 can form a second field of view of the image content 120 based on the one or more output signals.

The first waveguide 102A can include a first input region 103A for receiving the first light 155 and a first output region 105A. The first waveguide 102A can reflect the first light 155 within the first waveguide 102A towards the first output region 105A. The first waveguide 102A can include a second input region 103B for receiving the second light 156. The first waveguide 102A can reflect the second light 156 within the first waveguide 102A towards the first output region 105A.

The third steerable phased array 101C can generate a third light 157 of a third predetermined wavelength range, where the third light 157 can form a third field of view of the image content based on the one or more output signals. The second waveguide 102B can have a second input region 103B for receiving the third light 157 and a second output region 105B. The second waveguide 102B can reflect the third light 157 within the second waveguide 102B towards the second output region 105B. In addition, the first output region 105A and the second output region 105B can be aligned with a lens 180 directing light 151 from a real-world view 121 to create an output concurrently displaying the real-world view with a composite field of view of the first field of view, the second field of view, and the third field of view. The output can be directed to a user's eye 201.

Each of the predetermined wavelength ranges described herein can include a green light, a red light, or a blue light. For instance, the first predetermined wavelength range, second predetermined wavelength range, and the third predetermined wavelength range can individually include a first range including 460 nm (blue), a second range including 525 nm (green), or a third range including 617 nm (red). It can be appreciated that the ranges can be in any order. For example, the order of the steerable phased arrays, e.g., the first array 101A, the second array 101B, and the third array 101C, can be: RGB, GBR, BRG, RBG, GRB, BGR, etc.

Other wavelength ranges can be included herein, some of which can include other colors or parts of the light spectrum.

Figure 4:
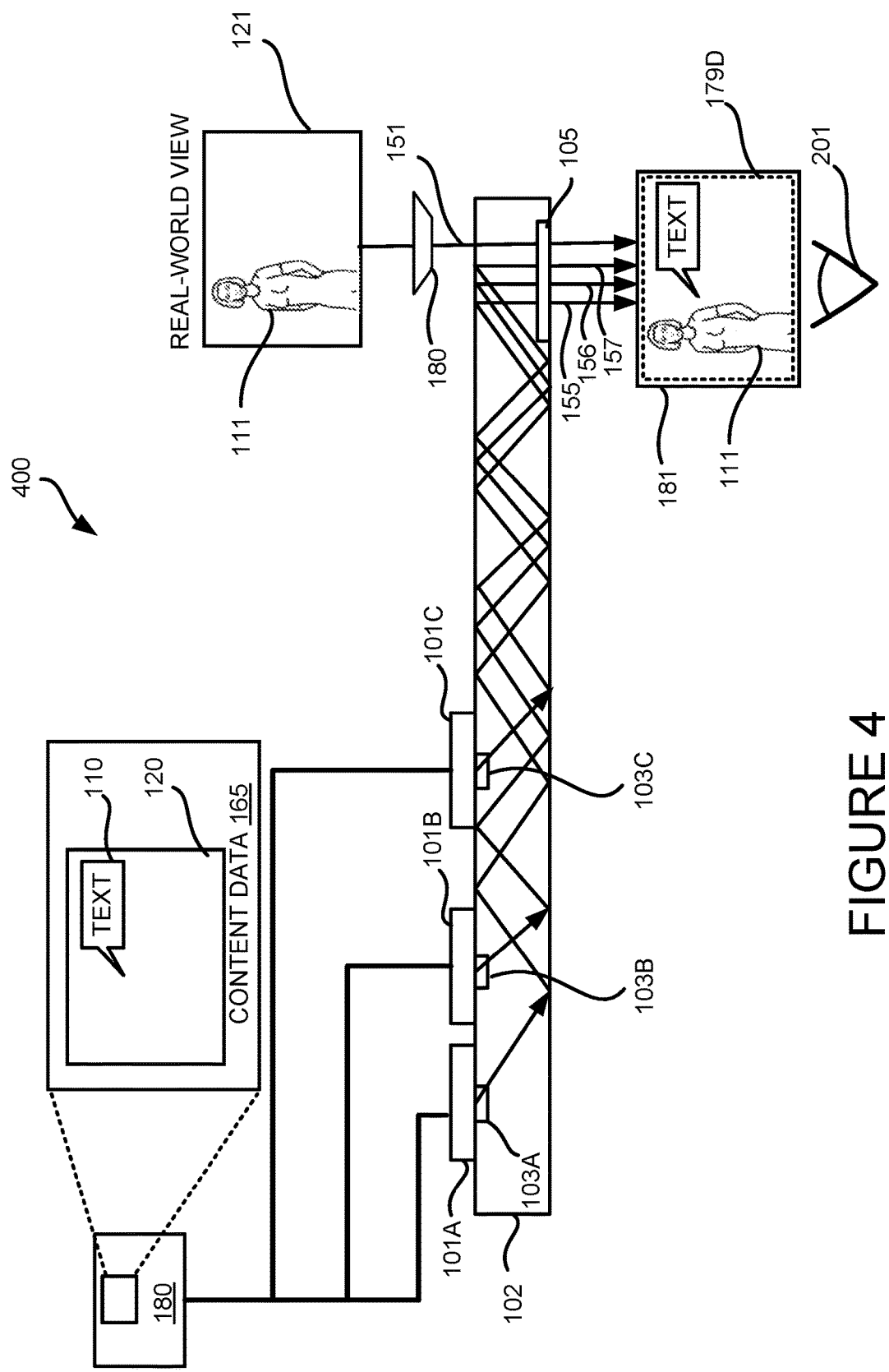
FIG. 4 illustrates aspects of an optical device including one waveguide and three steerable phased arrays.

FIG. 4 illustrates aspects of an optical device 400 including one waveguide and three steerable phased arrays. In such a configuration, three steerable phased arrays 101 each having their own predetermined wavelength range can project light into a single waveguide 102 to create an output as described above.

As shown, such an embodiment can include a controller 110 modulating one or more output signals comprising content data 165 defining image content 120. The one or more output signals can include content data 165 defining image content 120. The optical device 400 includes a waveguide 102 or a "grating structure 102." The optical device 400 can also include a first steerable phased array 101A, a second steerable phased array 101B, and a third steerable phased array 101C, which are individually and collectively referred to herein as a "steerable phased array 101."

The first steerable phased array 101A can be configured to generate a first light 155 of a first predetermined wavelength range, the first light 155 forming a first field of view of the image content 120 on the one or more output signals. The second steerable phased array 101B can generate a second light 156 of a second predetermined wavelength range, the second light 156 forming a second field of view of the image content 120 based on the one or more output signals. The third steerable phased array 101C can be configured to generate a third light 157 of a third predetermined wavelength range, the third light 157 forming a third field of view of the image content 120 based on the one or more output signals.

The waveguide 102 can include a first input region 103A for receiving the first light 155 and an output region 105, the waveguide 102 can be configured to reflect the first light 155 within the waveguide 102 towards the output region 105. The waveguide 102 can include a second input region 103B for receiving the second light 156. The waveguide 102 can be configured to reflect the second light 156 within the waveguide 102 towards the output region 105. The waveguide 102 can also include a third input region 103C for receiving the third light 157. The waveguide 102 can be configured to reflect the third light 157 within the waveguide 102 towards the output region 105. In such an embodiment, the output region 105 is aligned with a lens 180 directing light 151 from a real-world view 121 to create an output 181 concurrently displaying the real-world view 121 with a composite field of view of the first field of view, the second field of view, and the third field of view. Thus, as with all embodiments disclosed herein, the colors of each of the first field of view, the second field of view, and the third field of view can be combined to generate one composite field of view as shown in FIG. 2A.

Each of the predetermined wavelength ranges described herein can include a green light, a red light, or a blue light. For instance, the first predetermined wavelength range, second predetermined wavelength range, and the third predetermined wavelength range can individually include a first range including 460 nm (blue), a second range including 525 nm (green), or a third range including 617 nm (red). It can be appreciated that the ranges can be in any order. For example, the order of the steerable phased arrays, e.g., the first array 101A, the second array 101B, and the third array 101C, can be: RGB, GBR, BRG, RBG, GRB, BGR, etc. Other wavelength ranges can be included herein, some of which can include other colors or parts of the light spectrum.

Figure 5A:
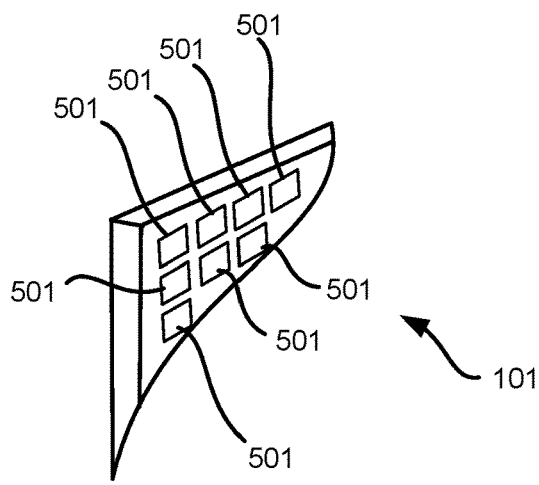
FIG. 5A illustrates aspects of a steerable phased array for emitting light having a single color.
Figure 5B:
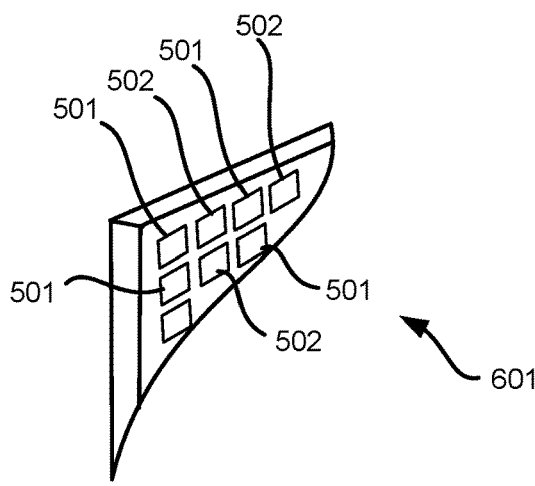
FIG. 5B illustrates aspects of a steerable phased array for emitting light having at least two colors.
Figure 5C:
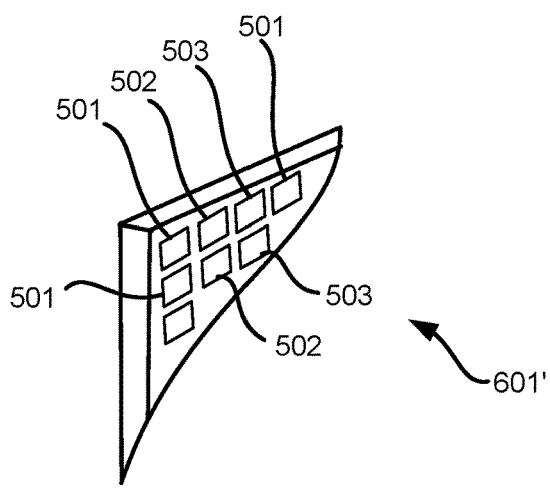
FIG. 5C illustrates aspects of a steerable phased array for emitting light having more than two colors.

The steerable phased arrays disclosed herein can include any suitable device for generating light forming a field of view at one or more predetermined wavelengths. In general, each steerable phased array can include individual light sources at predetermined wavelength. FIGS. 5A through 5C illustrate aspects of several steerable phased array designs.

FIG. 5A illustrates a first steerable phased array design 101 having individual light sources 501 at a single wavelength. In such an example, the individual light sources 501 can be configured to generate light having a particular color, such as red, blue, green, or any other suitable color. Thus, the first steerable phased array design 101 can generate light producing a two-dimensional field of view of image content with the light having a predetermined color. Such designs can be used in various optical devices disclosed herein such as those shown in FIG. 2B, FIG. 3, and FIG. 4.

FIG. 5B illustrates a second steerable phased array design 601 having two different types of individual light sources, a first light source 501 emitting light at a first wavelength and a second of light source 502 emitting light at a second wavelength. Thus, the second steerable phased array design 601 can generate light producing a two-dimensional field of view of image content with the light having one or two predetermined colors. Such designs can be used in various optical devices disclosed herein such as the embodiment shown in FIG. 6A.

FIG. 5C illustrates a third steerable phased array design 601' having three different types of individual light sources: a first light source 501 emitting light at a first wavelength, a second light source 501 emitting light at a second wavelength, and third light source 503 emitting light at a third wavelength. Thus, the third steerable phased array design 601' can generate light producing a two-dimensional field of view of image content with the light having one, two, or three predetermined colors. Such designs can be used in various optical devices disclosed herein such as the embodiment shown in FIG. 6B.

Figure 6A:
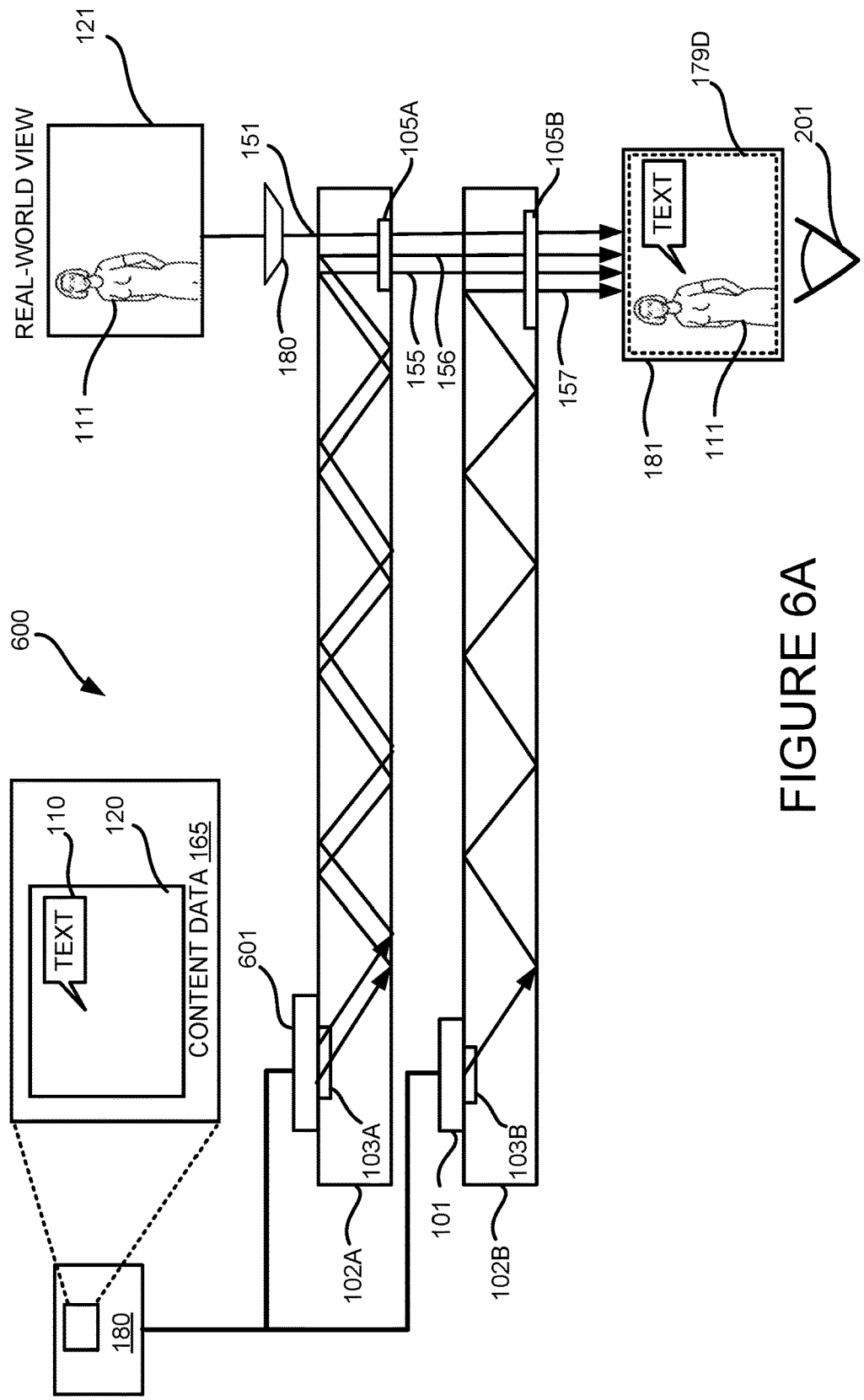
FIG. 6A illustrates aspects of an optical device including two waveguides and two steerable phased arrays.

FIG. 6A illustrates aspects of an optical device including two waveguides and two steerable phased arrays. This embodiment of an optical device 600 utilizes the second steerable phased array design 601 shown in FIG. 5B, also referred to herein as a "steerable phased array 601." As described above, the steerable phased array 601 can emit a first light at a first wavelength and a second light at a second wavelength. This optical device 600 also utilizes a second phased array 101, such as the design shown in FIG. 5A.

As shown in FIG. 6A, the optical device 600 includes a controller 110 modulating one or more output signals comprising content data 165 defining image content 120. In addition, the first steerable phased array 601 is configured to generate a first light 155 of a first predetermined wavelength range, the first light 155 forming a first field of view 179A of the image content based 120 on the one or more output signals. The first steerable phased array 601 is configured to generate a second light 156 of a second predetermined wavelength range, the second light 156 forming a second field of view 179B of the image content 120 based on the one or more output signals.

The optical device 600 also includes a first waveguide 102A is configured with a first input region 103A for receiving the first light 155 and a first output region 105A. The first waveguide 102A is configured to reflect the first light 155 within the first waveguide 102A towards the first output region 105A. The first waveguide 102A is configured with a second input region 103B for receiving the second light 156. The first waveguide 102A is configured to reflect the second light 156 within the first waveguide 102A towards the first output region 105A.

The optical device 600 also includes a second steerable phased array 101 configured to generate a third light 157 of a third predetermined wavelength range, the third light 157 forming a third field of view 179C of the image content 120 based on the one or more output signals.

The optical device 600 also includes a second waveguide 102B having a second input region 103B for receiving the third light 157 and a second output region 105B, the second waveguide 102B configured to reflect the third light 157 within the second waveguide 102B towards the second output region 105B. The first output region 105A and the second output region 105B are aligned with a lens 180 directing light 151 from a real-world view 121 to create an output 181 concurrently displaying the real-world view 121 with a composite field of view 179D of the first field of view 179A, the second field of view 179B, and the third field of view 179C.

Each of the predetermined wavelength ranges described herein can include a green light, a red light, or a blue light. For instance, the first predetermined wavelength range, second predetermined wavelength range, and the third predetermined wavelength range can individually include a first range including 460 nm (blue), a second range including 525 nm (green), or a third range including 617 nm (red). It can be appreciated that the ranges can be in any order. For example, the order of the waveguides configured for each wavelength range can be: RGB, GBR, BRG, RBG, GRB, BGR, etc. Other wavelength ranges can be included herein, some of which can include other colors or parts of the light spectrum. In one example of the embodiment shown in FIG. 6A, the first steerable phased array 601 can produce both a green and blue light, and the second steerable phased array 101 can produce red light. These examples are provided for illustrative purposes only and are not to be construed as limiting.

Figure 6B:
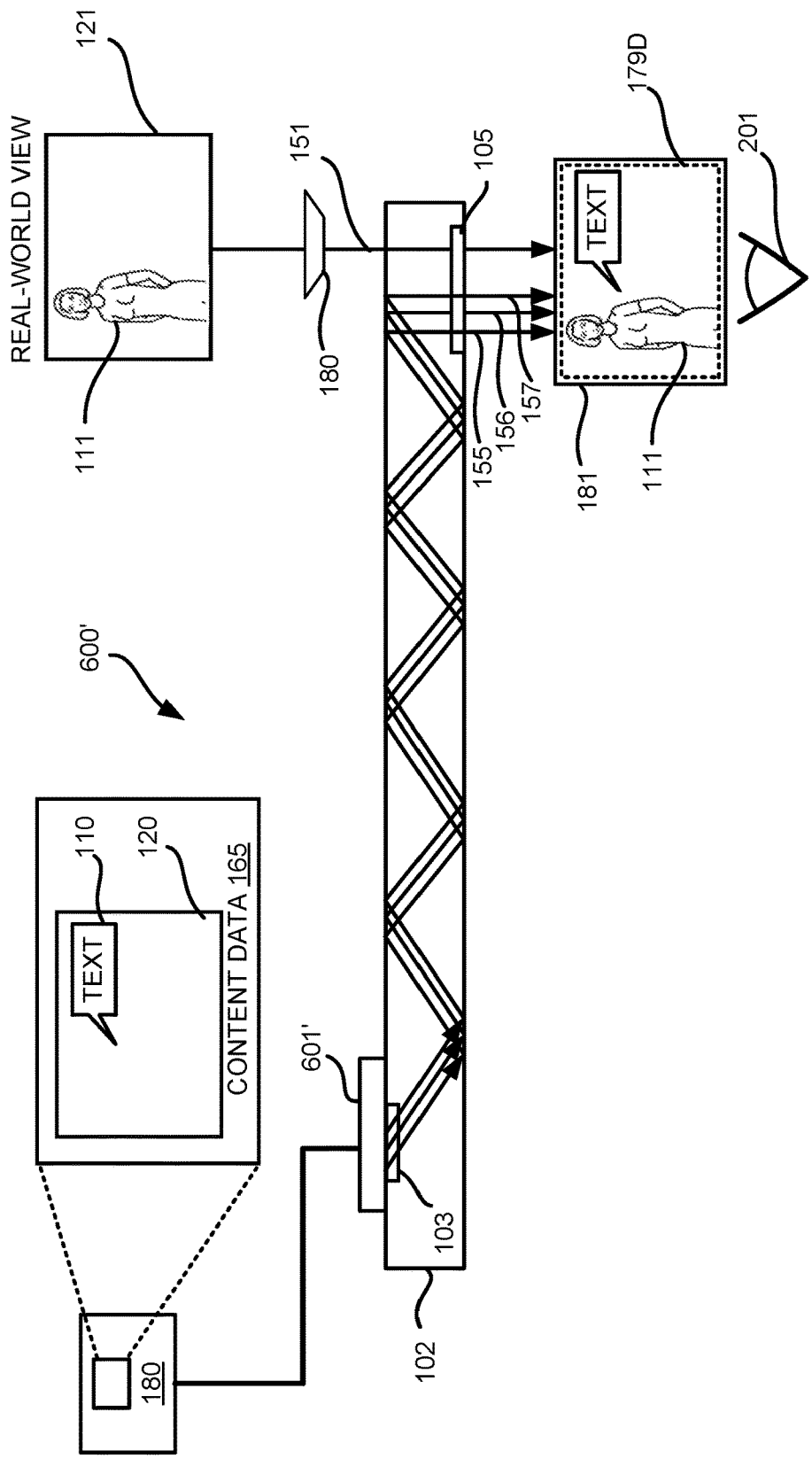
FIG. 6B illustrates aspects of an optical device including one waveguide and one steerable phased array.

FIG. 6B illustrates and aspects of an optical device 600' including one waveguide and one steerable phased array. This embodiment of an optical device 600' utilizes the third steerable phased array design 601' shown in FIG. 5C, also referred to herein as a "steerable phased array 601'." As described above, the steerable phased array 601' can emit a first light at a first wavelength, a second light at a second wavelength, and a third light at a third wavelength. For illustrative purposes, embodiments disclosed herein involving a steerable phased array generating light of a predetermined wavelength range means that the steerable phased array generates light within a predetermined wavelength range, wherein the predetermined wavelength range includes light at a predetermined wavelength. For example, a predetermined wavelength range can include blue light, green light, or red light, including light at a range including wavelengths of 460 nm (blue), 525 nm (green), and 617 nm (red).

As shown in FIG. 6B, the optical device 600' includes a controller 110 modulating one or more output signals comprising content data 165 defining image content 120. The optical device 600' also includes a steerable phased array 601' generating a first light 155 of a first predetermined wavelength range, the first light 155 forming a first field of view 179A of the image content based 120 on the one or more output signals. The first steerable phased array 601' also generating a second light 156 of a second predetermined wavelength range, the second light 156 forming a second field of view 179B of the image content 120 based on the one or more output signals. The steerable phased array 601' also generating a third light 157 of a third predetermined wavelength range, the third light 157 forming a third field of view 179C of the image content 120 based on the one or more output signals.

The optical device 600' also includes a waveguide 102 having an input region 103 for receiving the first light 155, the second light 156 and the third light 157. The waveguide 102 can be configured to reflect the first light 155, the second light 156 and the third light 157 within the first waveguide 102A towards an output region 105. In some configurations, the output region 105 is aligned with a lens 180 directing light 151 from a real-world view 121 to create an output 181 concurrently displaying the real-world view 121 with a composite field of view 179D of the first field of view 179A, the second field of view 179B, and the third field of view 179C.

Figure 7A:
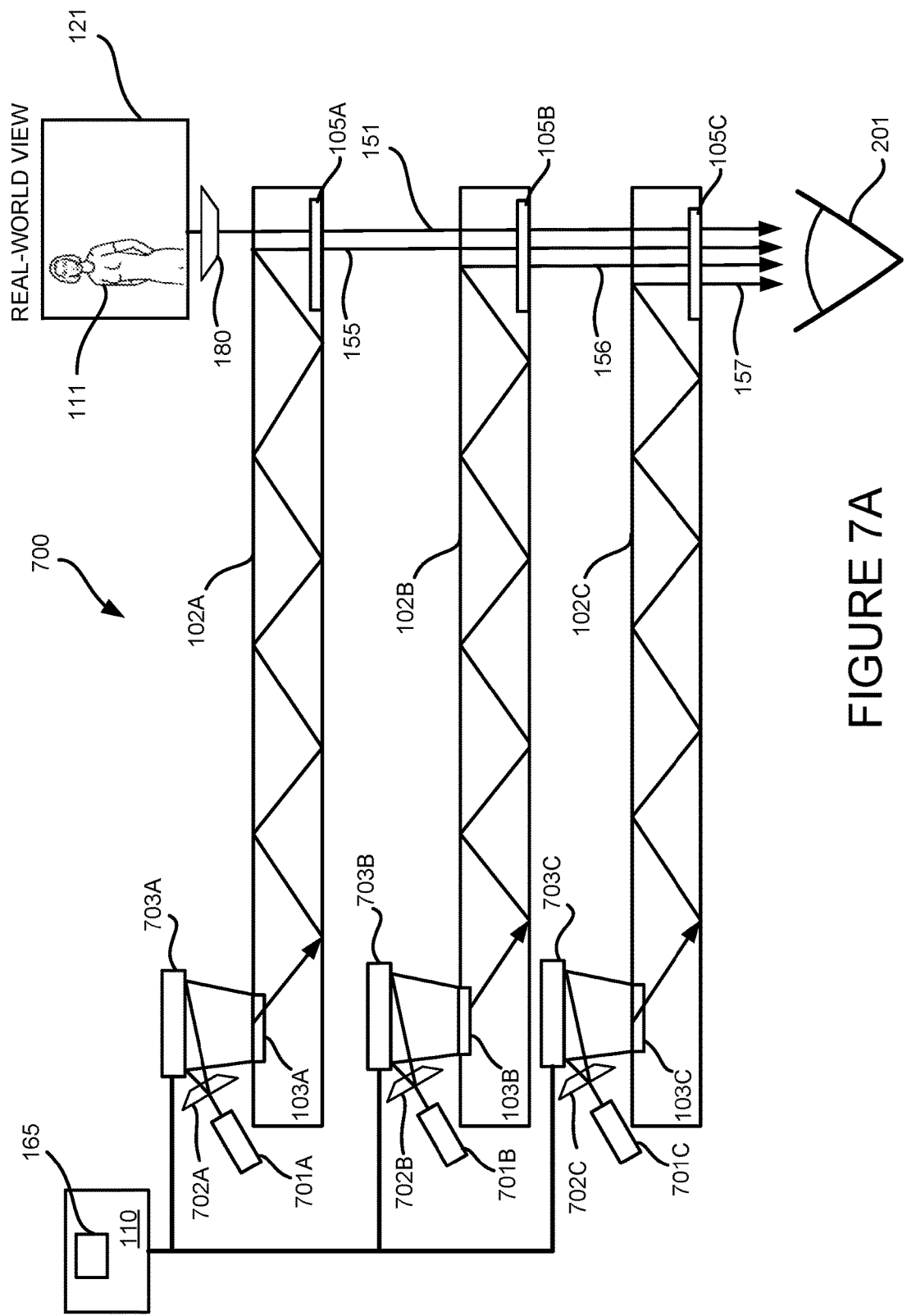
FIG. 7A illustrates aspects of alternative embodiments of optical devices including several waveguides and several LCOS microdisplays.

In some configurations, other light sources can be used. For instance, as shown in FIG. 7A, an optical device 700 comprises a plurality of laser diodes 701, a plurality of collimators/expanders 702, and a plurality of liquid crystal on silicon area panels 703 ("LCOS microdisplays 703"). Laser diodes or any other suitable light source emitting light at a predetermined wavelength can be utilized. The light of each Laser diode is then directed through a collimator, e.g., an expander, the output of which is directed to individual LCOS microdisplays 703. The LCOS microdisplays 703 generates a field of view of content by reflecting the generated light. The individual pixels on the LCOS create the phase sources which are used to steer the light, e.g., perform a raster scan, to produce a scanning beam. This scanning beam is then input into the waveguides as in the embodiments described above, e.g., an output signal fed from a controller 110 results in a light forming a field of view of an image.

As shown in FIG. 7A, the optical device 700 comprises a controller 110 modulating one or more output signals comprising image data 165 defining image content 120. The also optical device 700 comprise a first light source 703A generating a first light 155 that is directed through a first expander 702A to a first LCOS microdisplay 703A. The light sources 703 disclosed herein can be any suitable light source such as a laser diode. The first LCOS microdisplay 703A steers the first light 155 to form a first field of view 179A of the image content 120 based on the one or more output signals.

The optical device 700 also comprises a first waveguide 102A having a first input region 103A for receiving the first light 155 and a first output region 105A The first waveguide 102A reflects the first light 155 within the first waveguide 102A towards the first output region 105A.

The optical device 700 also comprises a second light source 703B generating a second light 156 that is directed through a second expander 702B to a second LCOS microdisplay 703B. The second LCOS microdisplay 703A steers the second light 155 to form a second field of view 179B of the image content 120 based on the one or more output signals.

The optical device 700 also comprises a second waveguide 102B having a second input region 103B for receiving the second light 156 and a second output region 105B the second waveguide 102B reflects the second light 156 within the second waveguide 102B towards the second output region 105B.

The optical device 700 also comprises a third light source 703C generating a third light 157 that is directed through a third expander 702C to a third LCOS microdisplay 703C. The third LCOS microdisplay 703C steers the third light 157 to form a third field of view 179C of the image content 120 based on the one or more output signals.

The optical device 700 also comprises a third waveguide 102C having a third input region 103C for receiving the third light 157 and a third output region 105C. The third waveguide 102C reflects the third light 157 within the third waveguide 102C towards the third second output region 105C. The first output region 105A, the second output region 105B, and the third output region 105C are aligned with a lens 180 directing light 151 from a real-world view 121 to create an output 181 concurrently displaying the real-world view 121 with a composite field of view 179D of the first field of view 179A, the second field of view 179B, and the third field of view 179C. In some configurations, the first output region 105A, the second output region 105B, the third output region 105C, and the lens 180 are aligned to project a rendered object 110 in a predetermined position relative to a view of a real-world object 111.

Figure 7B:
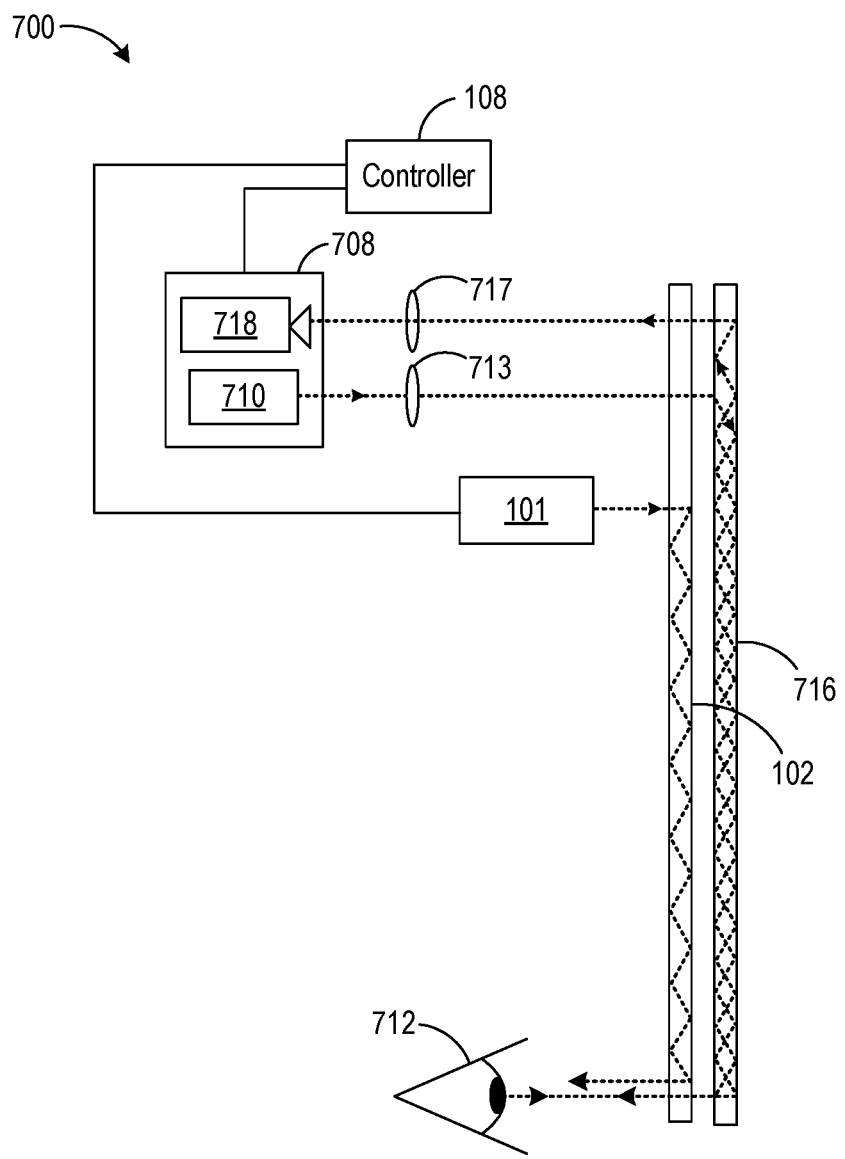
FIG. 7B illustrates aspects of alternative embodiments of optical devices including eye tracking components where the light from the eye tracking component passes through an imaging waveguide.

FIG. 7B schematically shows another example optical system 700 comprising one or more steerable phased arrays 101 for projecting light into a first waveguide 102 to create an output image directed to a user's eye 712 as described herein. The one or more steerable phased arrays 101 is configured to generate a field of view based on the one or more output signals as described herein.

The optical system 700 also includes an eye tracking system 708 having one or more light source(s) 710 and a camera 712. Light from light source(s) 710 is collimated by collimator 713 and also scanned by the scanning electro-optic element 706. Optical system 700 further includes a second waveguide 716. The second waveguide 716 is configured to receive light from one or more light source(s) 710 of the eye tracking system 708 and to propagate the light through second waveguide 716 and deliver the light to eye 712.

Light source(s) 710 may be configured to utilize different wavelengths of light than that utilized by the one or more steerable phased arrays 101, such as infrared light that is not visible to a user. For example, the light from the light source(s) 710 can be a predetermined wavelength, such as 850 nm. The light from light source(s) 710 reflects from eye 712 and returns in a reverse direction via second waveguide 716 to pass back through an imaging lens 717 to an eye tracking camera 718. Eye tracking camera 718 may capture images that can be analyzed to detect glints or reflections off the cornea (or other suitable anatomical structure) arising from the light source 710. For example, a single laser may be used to direct IR light in several different pre-determined directions, instead of using multiple light sources each configured to cause a single glint. In other examples, eye tracking system 708 may utilize any other suitable device including, but not limited to, a prism pair for causing a glint.

Optical system 700 also includes a controller 108 for controlling the one or more steerable phased arrays 101, the light source(s) 710 and the eye tracking camera 718 of eye tracking system 708. In some examples, controller 108 may be configured to provide foveated display capabilities. More specifically, eye tracking may be used to estimate a location of a user's fovea. Then, higher resolution foveal images may be displayed in the estimated location of the fovea, and lower resolution image may be displayed peripherally. The location at which foveal images are displayed likewise may be updated as the position of the user's eye moves.

Figure 7C:
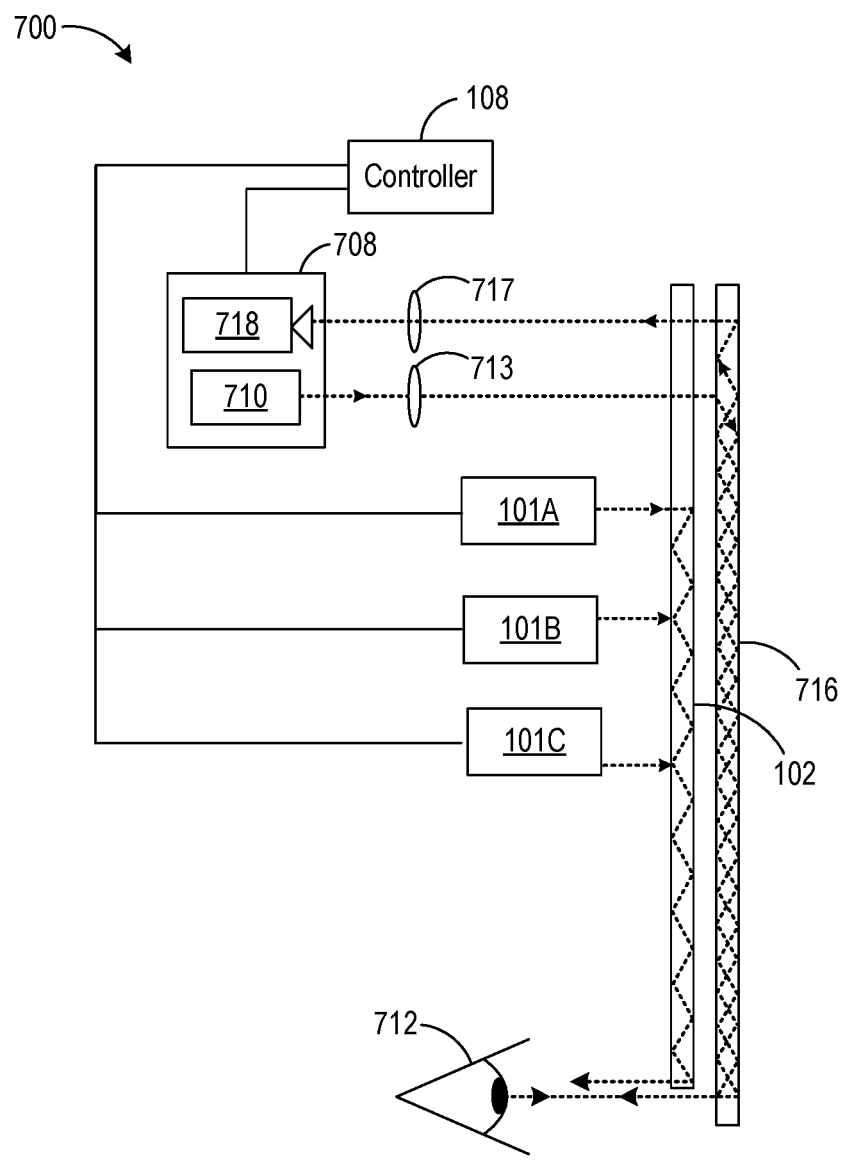
FIG. 7C illustrates aspects of alternative embodiments of optical devices including eye tracking components where the light from the eye tracking component does not pass through an imaging waveguide.
Figure 7D:
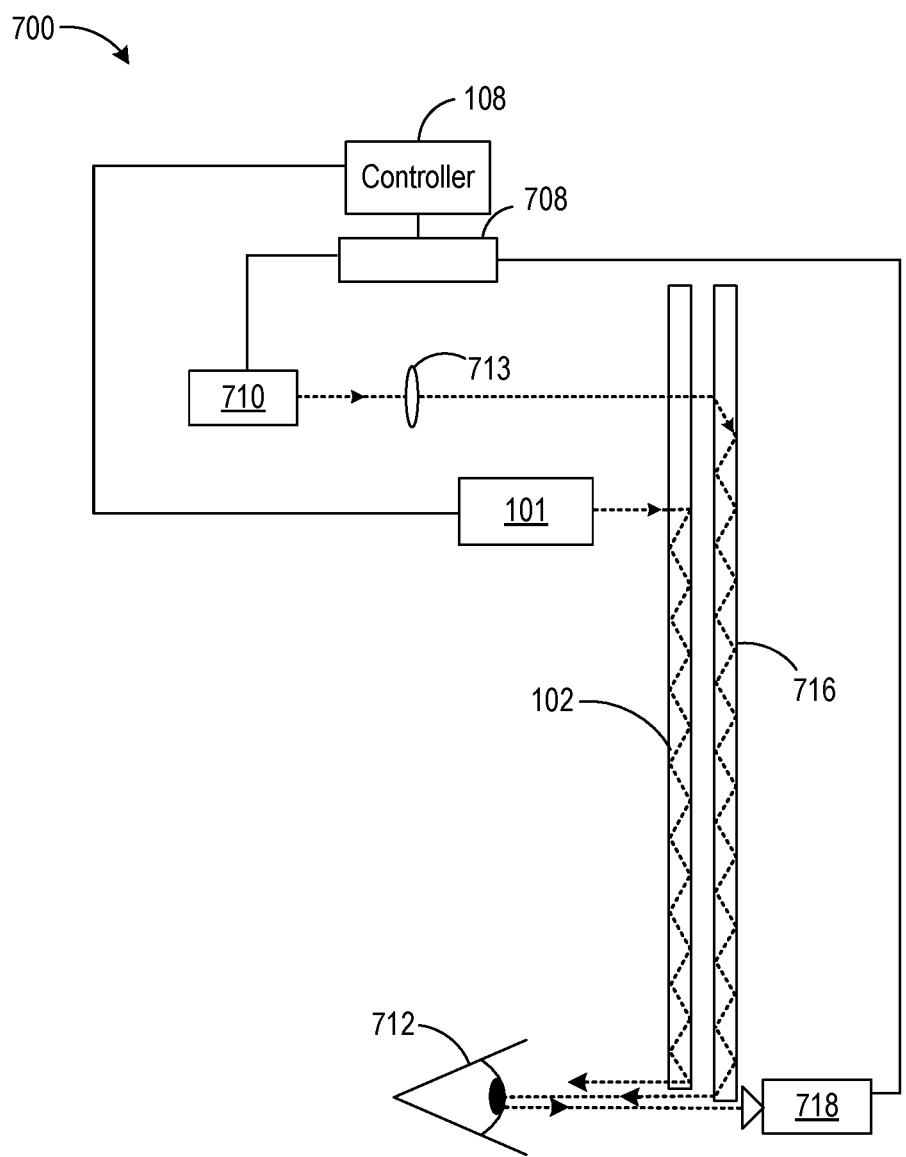
FIG. 7D illustrates aspects of alternative embodiments of optical devices including eye tracking components where the light reflecting from a user's eye is directed to a sensor.

FIG. 7B illustrates an embodiment where the light from the eye tracking components passes through the first waveguide 102. FIG. 7C illustrates an embodiment where the light from the eye tracking components does not pass through the first waveguide 102. FIG. 7D illustrates an example where light from the eye tracking source 710 is delivered to the eye 712 via a second waveguide 716 and then reflected from the eye 712 directly into the eye tracking camera 718. In some configurations, the eye tracking camera 718 can be mounted near the periphery of the display waveguide 102 to capture the light reflected from the eye 712. Having such an arrangement can be more efficient and thus has a higher signal-to-noise and lower power requirement. The eye tracking system disclosed herein can be applied to any of the embodiments disclosed herein, including embodiments with two or three waveguides 102.

Figure 8:
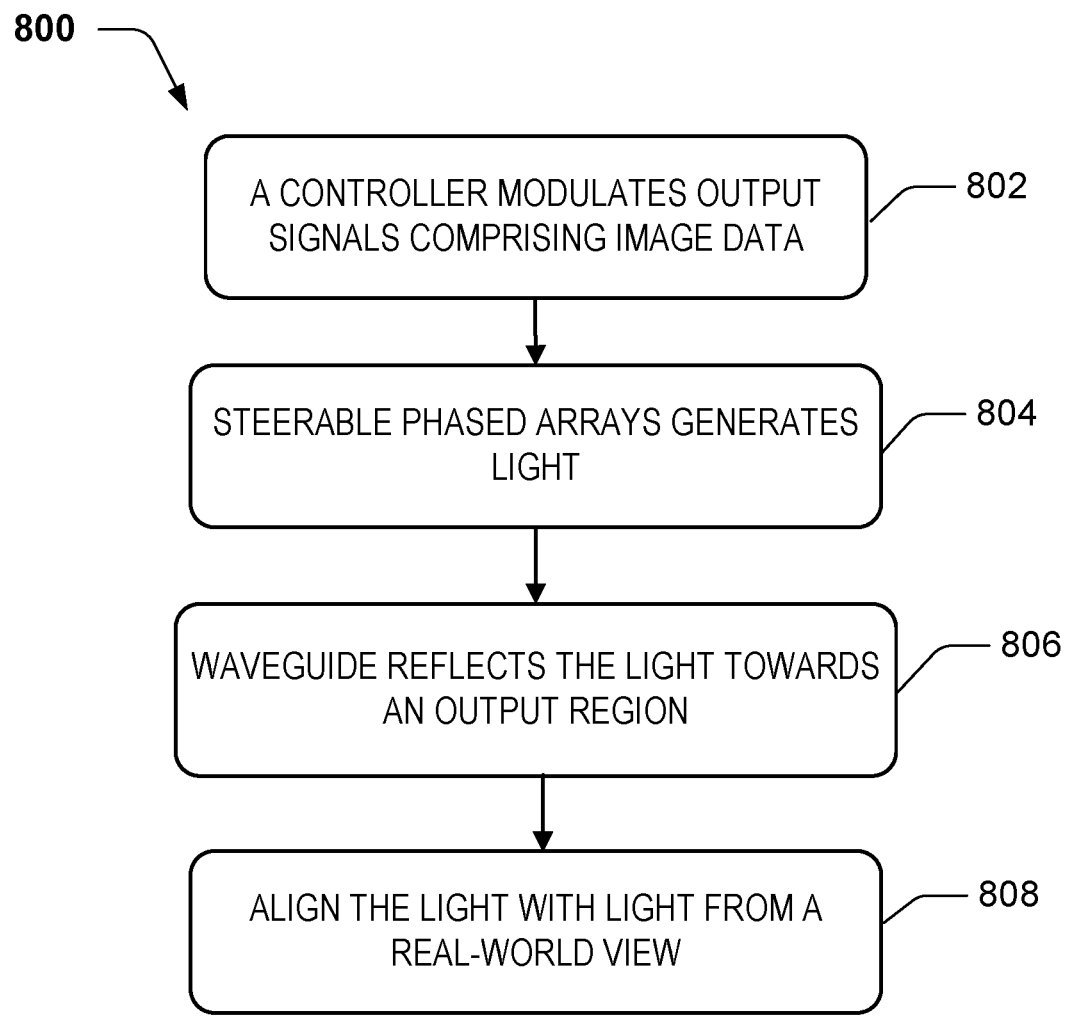
FIG. 8 is a flowchart illustrating an example method of scanning light in an optical system.

FIG. 8 shows an example method 800 for providing a near-to-eye display with steerable phased arrays. The method 800 includes an operation where, as shown in block 802, a controller 110 modulates one or more output signals comprising image data 165 defining image content 120.

Next, as shown in block 804, one or more steerable phased arrays 101 generate light of a first predetermined wavelength or within a wavelength range. The light forming a field of view of the image content 120 based on the one or more output signals. Next, as shown in block 806, a waveguide 102 receives the light to reflect the light within the waveguide 102 towards an output region 105.

Next, as shown in block 808, the waveguide 102 aligns the light emitting from the output region 105 with a lens 180 directing light 151 from a real-world view 121 to create an output 181 concurrently displaying a real-world view 121 with the generated field of view 179. In some configurations, the output region 105 and the lens 180 are aligned to project a rendered object 110 in a predetermined position relative to a view of a real-world object 111.

While described herein in the context of near-eye display systems, the example optical systems and methods disclosed herein may be used in any suitable optical system, such as a rifle scope, telescope, spotting scope, binoculars, and heads-up display.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
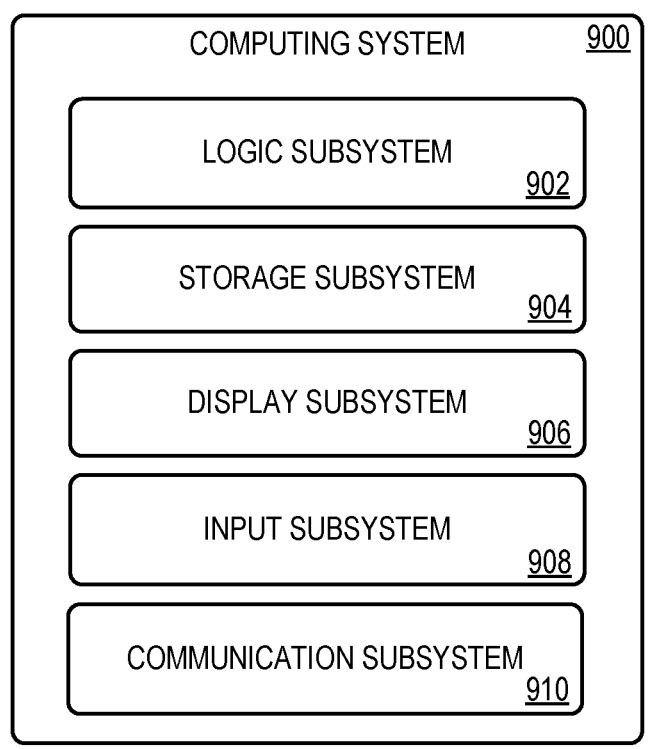
FIG. 9 shows a block diagram of an example computing system.

FIG. 9 schematically shows a non-limiting embodiment of a computing system 900 that can enact one or more of the methods and processes described above. Computing system 900 is shown in simplified form. Computing system 900 may take the form of one or more personal computers, server computers, tablet computers, home-entertainment computers, network computing devices, gaming devices, mobile computing devices, mobile communication devices (e.g., smart phone), and/or other computing devices.

Computing system 900 includes a logic subsystem 902 and a storage subsystem 904. Computing system 900 may optionally include a display subsystem 906, input subsystem 908, communication subsystem 910, and/or other components not shown in FIG. 9.

Logic subsystem 902 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Logic subsystem 902 may include one or more processors configured to execute software instructions. Additionally or alternatively, logic subsystem 902 may include one or more hardware or firmware logic machines configured to execute hardware or firmware instructions. Processors of logic subsystem 902 may be single-core or multi-core, and the instructions executed thereon may be configured for sequential, parallel, and/or distributed processing. Individual components of logic subsystem 902 optionally may be distributed among two or more separate devices, which may be remotely located and/or configured for coordinated processing. Aspects of logic subsystem 902 may be virtualized and executed by remotely accessible, networked computing devices configured in a cloud-computing configuration.

Storage subsystem 904 includes one or more physical devices configured to hold instructions executable by logic subsystem 902 to implement the methods and processes described herein. When such methods and processes are implemented, the state of storage subsystem 904 may be transformed—e.g., to hold different data.

Storage subsystem 904 may include removable and/or built-in devices. Storage subsystem 904 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 904 may include volatile, nonvolatile, dynamic, static, read/write, read-only, random-access, sequential-access, location-addressable, file-addressable, and/or content-addressable devices.

It will be appreciated that storage subsystem 904 includes one or more physical devices. However, aspects of the instructions described herein alternatively may be propagated by a communication medium (e.g., an electromagnetic signal, an optical signal, etc.) as opposed to being stored on a storage medium.

Aspects of logic subsystem 902 and storage subsystem 904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 906 may be used to present a visual representation of data held by storage subsystem 904. This visual representation may take the form of a graphical user interface (GUI). As the herein described methods and processes change the data held by the storage machine, and thus transform the state of the storage machine, the state of display subsystem 906 may likewise be transformed to visually represent changes in the underlying data. Display subsystem 906 may include one or more display devices utilizing virtually any type of technology. Such display devices may be combined with logic subsystem 902 and/or storage subsystem 904 in a shared enclosure, or such display devices may be peripheral display devices.

When included, input subsystem 908 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 910 may be configured to communicatively couple computing system 900 with one or more other computing devices. Communication subsystem 910 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 900 to send and/or receive messages to and/or from other devices via a network such as the Internet.

This disclosure also includes the following examples:

Example 1

An optical device (400), comprising: a controller (110) modulating one or more output signals comprising content data (165) defining image content (120); a first steerable phased array (101A) generating a first light (155) of a first predetermined wavelength range, the first light (155) forming a first field of view of the image content (120) based on the one or more output signals; a second steerable phased array (101B) generating a second light (156) of a second predetermined wavelength range, the second light (156) forming a second field of view of the image content (120) based on the one or more output signals; a third steerable phased array (101C) generating a third light (157) of a third predetermined wavelength range, the third light (157) forming a third field of view of the image content (120) based on the one or more output signals; a waveguide (102) having a first input region (103A) for receiving the first light (155) and an output region (105), the waveguide (102) reflecting the first light (155) within the waveguide (102) towards the output region (105), the waveguide (102) having a second input region (103B) for receiving the second light (156), the waveguide (102) reflecting the second light (156) within the waveguide (102) towards the output region (105), the waveguide (102) having a third input region (103C) for receiving the third light (157), the waveguide (102) reflecting the third light (157) within the waveguide (102) towards the output region (105), wherein the output region (105) is aligned with a lens (180) directing light (151) from a real-world view (121) to create an output (181) concurrently displaying the real-world view (121) with a composite field of view of the first field of view, the second field of view, and the third field of view.

Example 2

The optical device of example 1, wherein the first output region (105A), the second output region (105B), and the lens (180) are aligned to display a rendered object (110) in a predetermined position relative to a view of a real-world object (111).

Example 3

The optical device of examples 1-2, wherein the first predetermined wavelength range comprises a first range including 460 nm, a second range including 525 nm, or a third range including 617 nm.

Example 4

The optical device of examples 1-3, wherein the second predetermined wavelength range comprises a first range including 460 nm, a second range including 525 nm, or a third range including 617 nm.

Example 5

The optical device of examples 1-4, wherein the third predetermined wavelength range comprises a first range including 460 nm, a second range including 525 nm, or a third range including 617 nm.

Example 6

The optical device of examples 1-5, further comprising an eye tracking system for providing an eye tracking signal based on light reflecting from an eye of a user, wherein the controller provides higher resolution foveal images and lower resolution peripheral images based upon the eye tracking signal.

Example 7

An optical device (600), comprising: a controller (110) modulating one or more output signals comprising content data (165) defining image content (120); a first steerable phased array (601) generating a first light (155) of a first predetermined wavelength range, the first light (155) forming a first field of view (179A) of the image content (120) based on the one or more output signals, the first steerable phased array (601) generating a second light (156) of a second predetermined wavelength range, the second light (156) forming a second field of view (179B) of the image content (120) based on the one or more output signals; a first waveguide (102A) having a first input region (103A) for receiving the first light (155) and a first output region (105A), the first waveguide (102A) reflecting the first light (155) within the first waveguide (102A) towards the first output region (105A), the first waveguide (102A) having a second input region (103B) for receiving the second light (156), the first waveguide (102A) reflecting the second light (156) within the first waveguide (102A) towards the first output region (105A); a second steerable phased array (101) generating a third light (157) of a third predetermined wavelength range, the third light (157) forming a third field of view (179C) of the image content (120) based on the one or more output signals; and a second waveguide (102B) having a second input region (103B) for receiving the third light (157) and a second output region (105B), the second waveguide (102B) reflecting the third light (157) within the second waveguide (102B) towards the second output region (105B), wherein the first output region (105A) and the second output region (105B) are aligned with a lens (180) directing light (151) from a real-world view (121) to create an output (181) concurrently displaying the real-world view (121) with a composite field of view (179D) of the first field of view (179A), the second field of view (179B), and the third field of view (179C).

Example 8

The optical device of example 7, wherein the first output region (105A), the second output region (105B), and the lens (180) are aligned to display a rendered object (110) in a predetermined position relative to a view of a real-world object (111).

Example 9

The optical device of examples 7-8, wherein the first predetermined wavelength range comprises a first range including 460 nm, a second range including 525 nm, or a third range including 617 nm.

Example 10

The optical device of examples 7-9, wherein the second predetermined wavelength range comprises a first range including 460 nm, a second range including 525 nm, or a third range including 617 nm.

Example 11

The optical device of examples 7-10, wherein the third predetermined wavelength range comprises a first range including 460 nm, a second range including 525 nm, or a third range including 617 nm.

Example 12

The optical device of examples 7-11, further comprising an eye tracking system for providing an eye tracking signal based on light reflecting from an eye of a user, wherein the controller provides higher resolution foveal images and lower resolution peripheral images based upon the eye tracking signal.

Example 13

An optical device (600'), comprising: a controller (110) modulating one or more output signals comprising content data (165) defining image content (120); a steerable phased array (601') generating a first light (155) of a first predetermined wavelength range, the first light (155) forming a first field of view (179A) of the image content (120) based on the one or more output signals, the first steerable phased array (601') generating a second light (156) of a second predetermined wavelength range, the second light (156) forming a second field of view (179B) of the image content (120) based on the one or more output signals, the steerable phased array (601') generating a third light (157) of a third predetermined wavelength range, the third light (157) forming a third field of view (179C) of the image content (120) based on the one or more output signals; a waveguide (102) having an input region (103) for receiving the first light (155), the second light (156) and the third light (157), the waveguide (102) reflecting the first light (155), the second light (156) and the third light (157) within the first waveguide (102A) towards an output region (105), wherein the output region (105) is aligned with a lens (180) directing light (151) from a real-world view (121) to create an output (181) concurrently displaying the real-world view (121) with a composite field of view (179D) of the first field of view (179A), the second field of view (179B), and the third field of view (179C).

Example 14

The optical device of example 13, wherein the output region (105) and the lens (180) are aligned to display a rendered object (110) in a predetermined position relative to a view of a real-world object (111).

Example 15

The optical device of examples 13-14, wherein the first predetermined wavelength range comprises a first range including 460 nm, a second range including 525 nm, or a third range including 617 nm.

Example 16

The optical device of examples 13-15, wherein the second predetermined wavelength range comprises a first range including 460 nm, a second range including 525 nm, or a third range including 617 nm.

Example 17

The optical device of examples 13-16, wherein the third predetermined wavelength range comprises a first range including 460 nm, a second range including 525 nm, or a third range including 617 nm.

Example 18

The optical device of examples 13-17, further comprising an eye tracking system for providing an eye tracking signal based on light reflecting from an eye of a user, wherein the controller provides higher resolution foveal images and lower resolution peripheral images based upon the eye tracking signal.

Example 19

An optical device (700), comprising: a controller (110) modulating one or more output signals comprising image data (165) defining image content (120); a first light source (703A) generating a first light (155) that is directed through a first expander 702A to a first LCOS microdisplay (703A), the first LCOS microdisplay 703A steering the first light (155) to form a first field of view (179A) of the image content (120) based on the one or more output signals; a first waveguide (102A) having a first input region (103A) for receiving the first light (155) and a first output region (105A), the first waveguide (102A) reflecting the first light (155) within the first waveguide (102A) towards the first output region (105A); a second light source (703B) generating a second light (156) that is directed through a second expander 702B to a second LCOS microdisplay (703B), the second LCOS microdisplay 703A steering the second light (155) to form a second field of view (179B) of the image content (120) based on the one or more output signals; a second waveguide (102B) having a second input region (103B) for receiving the second light (156) and a second output region (105B), the second waveguide (102B) reflecting the second light (156) within the second waveguide (102B) towards the second output region (105B); a third light source (703C) generating a third light (157) that is directed through a third expander 702C to a third LCOS microdisplay (703C), the third LCOS microdisplay 703C steering the third light (157) to form a third field of view (179C) of the image content (120) based on the one or more output signals; and a third waveguide (102C) having a third input region (103C) for receiving the third light (157) and a third output region (105C), the third waveguide (102C) reflecting the third light (157) within the third waveguide (102C) towards the third second output region (105C), wherein the first output region (105A), the second output region (105B), and the third output region (105C) are aligned with a lens (180) directing light (151) from a real-world view (121) to create an output (181) concurrently displaying the real-world view (121) with a composite field of view (179D) of the first field of view (179A), the second field of view (179B), and the third field of view (179C).

Example 20

The optical device of example 19, wherein the first output region (105A), the second output region (105B), the third output region (105C), and the lens (180) are aligned to project a rendered object (110) in a predetermined position relative to a view of a real-world object (111).

Example 21

The optical device of examples 19-20, wherein the first predetermined wavelength range comprises a first range including 460 nm, a second range including 525 nm, or a third range including 617 nm.

Example 22

The optical device of examples 19-20, wherein the second predetermined wavelength range comprises a first range including 460 nm, a second range including 525 nm, or a third range including 617 nm.

Example 23

The optical device of examples 19-22, wherein the third predetermined wavelength range comprises a first range including 460 nm, a second range including 525 nm, or a third range including 617 nm.

Example 24

The optical device of examples 19-23, further comprising an eye tracking system for providing an eye tracking signal based on light reflecting from an eye of a user, wherein the controller provides higher resolution foveal images and lower resolution peripheral images based upon the eye tracking signal.

Based on the foregoing, it should be appreciated that concepts and technologies have been disclosed herein that provide formable interface and shielding structures. Although the subject matter presented herein has been described in language specific to some structural features, methodological and transformative acts, and specific machinery, it is to be understood that the invention defined in the appended claims is not necessarily limited to the specific features or acts described herein. Rather, the specific features and acts are disclosed as example forms of implementing the claims.

The subject matter described above is provided by way of illustration only and should not be construed as limiting. Various modifications and changes may be made to the subject matter described herein without following the example configurations and applications illustrated and described, and without departing from the true spirit and scope of the present invention, which is set forth in the following claims.

What is claimed is:

1. An optical device, comprising:
a controller modulating one or more output signals comprising image data defining image content;
a first steerable phased array generating a first light of a first predetermined wavelength range, the first light forming a first field of view of the image content based on the one or more output signals;
a first waveguide having a first input region for receiving the first light and a first output region, the first waveguide reflecting the first light within the first waveguide towards the first output region;
a second steerable phased array generating a second light of a second predetermined wavelength range, the second light forming a second field of view of the image content based on the one or more output signals;
a second waveguide having a second input region for receiving the second light and a second output region, the second waveguide reflecting the second light within the second waveguide towards the second output region;
a third steerable phased array generating a third light of a third predetermined wavelength range, the third light forming a third field of view of the image content based on the one or more output signals; and
a third waveguide having a third input region for receiving the third light and a third output region, the third waveguide reflecting the third light within the third waveguide towards the third output region, wherein the first output region, the second output region, and the third output region are aligned with a lens directing light from a real-world view to create an output concurrently displaying the real-world view with a composite field of view of the first field of view, the second field of view, and the third field of view.

2. The optical device of claim 1, wherein the first output region, the second output region, the third output region, and the lens are aligned to project a rendered object in a predetermined position relative to a view of a real-world object.

3. The optical device of claim 1, wherein the light from the real-world view passes through transparent sections of the first waveguide, the second waveguide, and the third waveguide.

4. The optical device of claim 1, wherein the first predetermined wavelength range comprises a first range including 460 nm, a second range including 525 nm, or a third range including 617 nm.

5. The optical device of claim 1, wherein the second predetermined wavelength range comprises a first range including 460 nm, a second range including 525 nm, or a third range including 617 nm.

6. The optical device of claim 1, wherein the third predetermined wavelength range comprises a first range including 460 nm, a second range including 525 nm, or a third range including 617 nm.

* * * * *